(12) United States Patent
Brown

(10) Patent No.: US 8,059,322 B1
(45) Date of Patent: Nov. 15, 2011

(54) SYSTEM FOR SUPPRESSING UNDESIRABLE OSCILLATIONS IN A MEMS SCANNER

(75) Inventor: James Steven Brown, Alviso, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 538 days.

(21) Appl. No.: 12/283,759

(22) Filed: Sep. 16, 2008

(51) Int. Cl.
*G02B 26/08* (2006.01)
(52) U.S. Cl. ............... 359/199.1; 359/199.4; 331/154; 331/155
(58) Field of Classification Search .... 359/198.1–199.4, 359/213.1–215.1, 223.1–226.2; 331/154–155
See application file for complete search history.

(56) References Cited

U.S. PATENT DOCUMENTS

| | | | |
|---|---|---|---|
| 6,703,603 B2 * | 3/2004 | Tohyama et al. | 250/234 |
| 6,856,712 B2 | 2/2005 | Fauver et al. | |
| 6,995,622 B2 | 2/2006 | Partridge et al. | |
| 7,907,019 B1 | 3/2011 | Brown | |
| 2005/0179976 A1 | 8/2005 | Davis et al. | |
| 2005/0280879 A1 | 12/2005 | Gibson et al. | |
| 2007/0063134 A1 | 3/2007 | Wine et al. | |
| 2007/0131842 A1 | 6/2007 | Ernst | |
| 2007/0273794 A1 | 11/2007 | Sprague et al. | |
| 2008/0144150 A1 | 6/2008 | Champion et al. | |
| 2010/0321750 A1 | 12/2010 | Burinskiy et al. | |

OTHER PUBLICATIONS

Pablo Gomez, "State-of-the-art of MEMS Technology for Design and Fabrication of Micro-Mirrors", 2003, 14 pages.
Chuanwei Wang, et al., "Implementation of phase-locked loop control for MEMS scanning mirror using DSP", ScienceDirect, Sensor and Actuators A 133, 2007, p. 243-249.
Randy Sprague, et al., "Bi-axial magnetic drive for Scanned Beam Display mirrors", Proc. of SPIE, vol. 5721, 2005, p. 1-13.
Notification of Transmittal of the International Search Report and the Written Opinion of the International Searching Authority, or the Declaration dated Nov. 26, 2010 in connection with International Patent Application No. PCT/US2010/032268.
Pablo Gomez, "State-of-the-art of MEMS Technology for Design and Fabrication of Micro-Mirrors", Florida International University, Advanced Electronics Systems I, Spring 2003, 12 pages.
Shorya Awtar, et al., "Two-Axis Optical MEMS Scanner", Proc. ASPE 2005 Annual Meeting, paper No. 1800, 2005, 4 pages.
James S. Brown, "Method and System for Generating a Drive Signal for a MEMS Scanner", U.S. Appl. No. 12/286,605, filed Oct. 1, 2008.

* cited by examiner

*Primary Examiner* — James Phan

(57) ABSTRACT

A system for suppressing undesirable oscillations in a micro-electro-mechanical system (MEMS) scanner is provided. The system includes a tunable notch filter and a MEMS scanner. The tunable notch filter is operable to receive an original drive signal and to generate a compensated drive signal based on the original drive signal. The MEMS scanner, which is coupled to the tunable notch filter, is operable to receive the compensated drive signal and to be driven by the compensated drive signal without oscillating at a first mode resonance frequency.

20 Claims, 17 Drawing Sheets

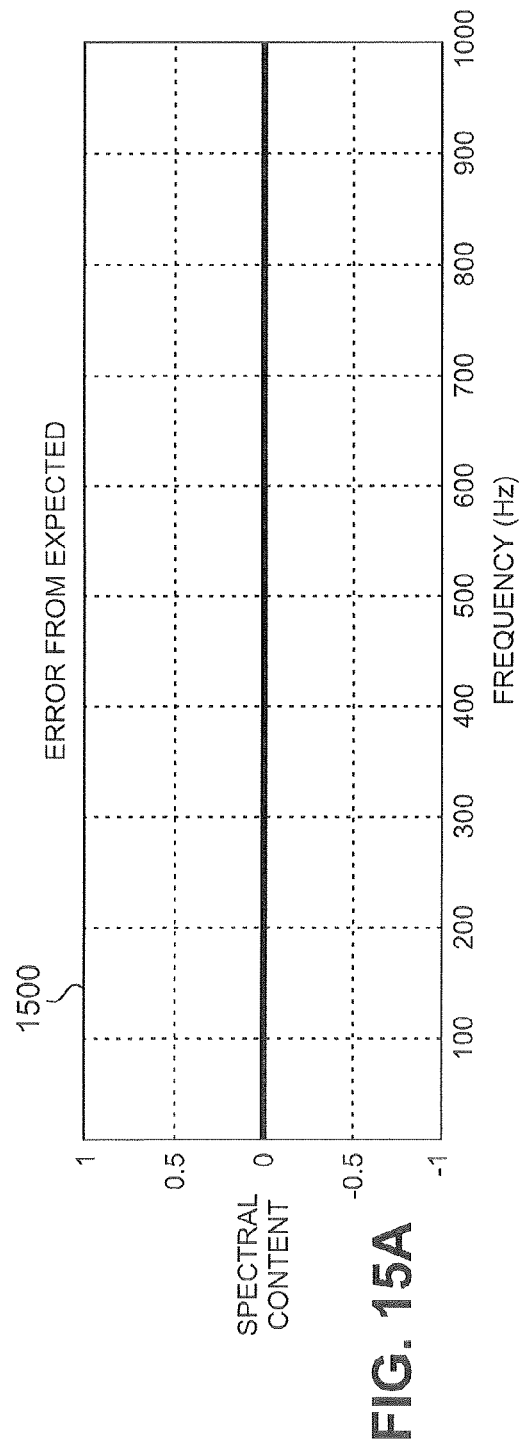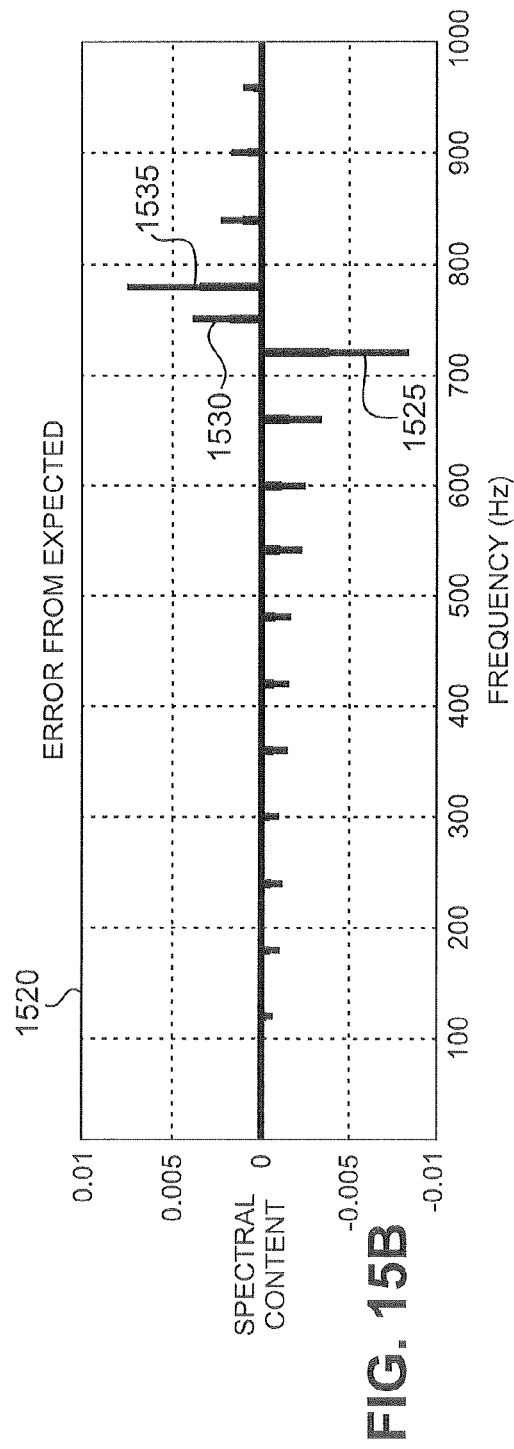

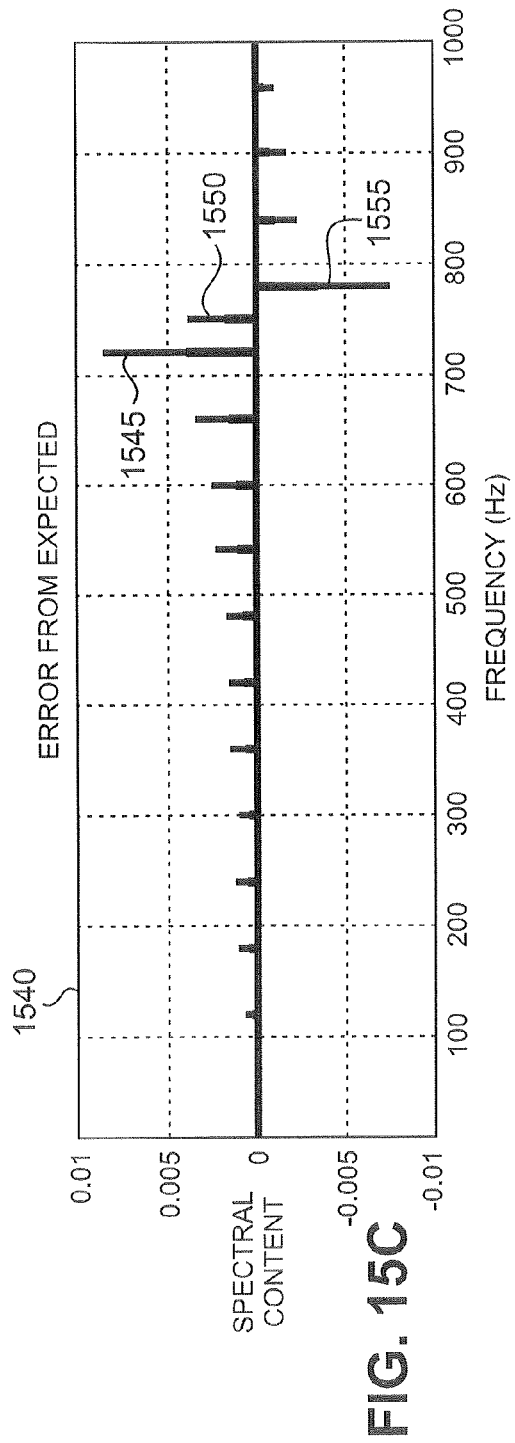
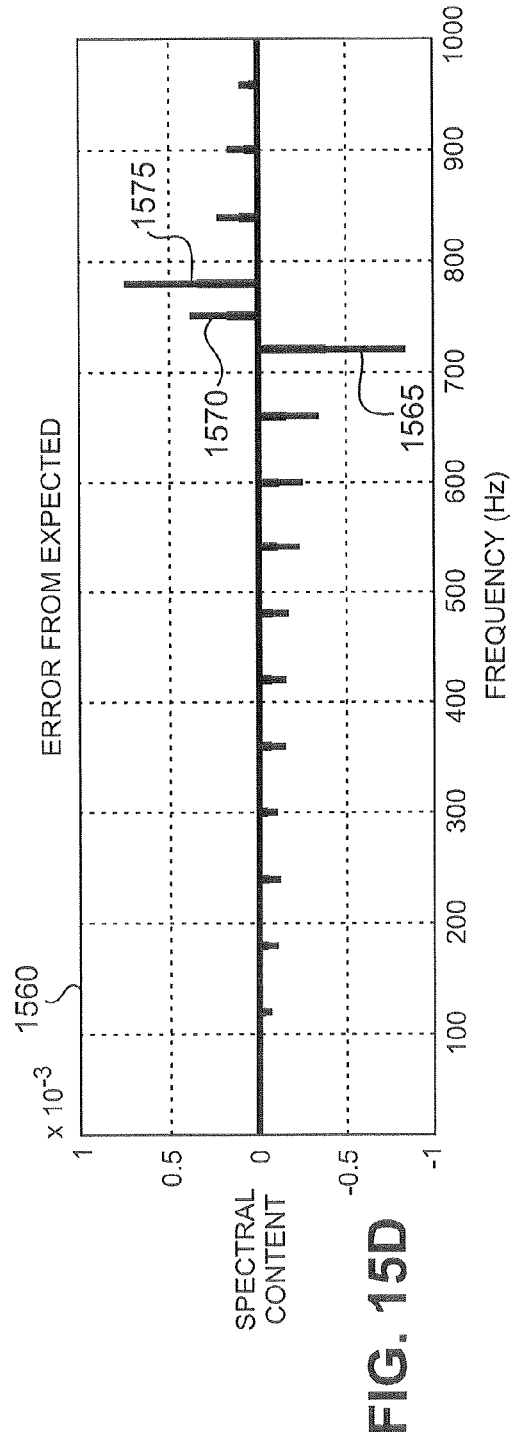

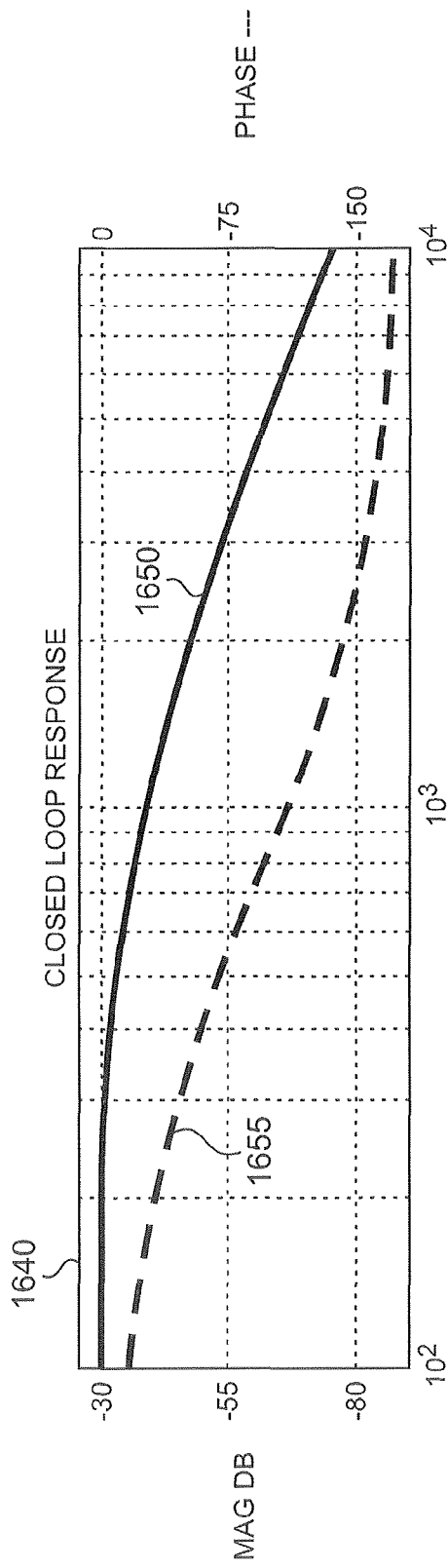

SYSTEM FOR SUPPRESSING UNDESIRABLE OSCILLATIONS IN A MEMS SCANNER

TECHNICAL FIELD

This disclosure is generally related to MEMS technology and, more specifically, to a system for suppressing undesirable oscillations in a MEMS scanning mirror for miniaturized projection systems.

BACKGROUND

Video projectors have been used extensively in business environments and have recently come into wide use in large-screen projection systems in home theaters. The miniaturization of projection systems has led to the development of "pico-projectors" that may be embedded in other systems, such as mobile phones and heads-up displays for vehicle dashboards, or may be implemented as stand-alone devices, such as pocket or ultra-mobile projectors that may be powered from a battery or an external power source. These miniature systems use highly efficient LED or LASER light sources.

One example of a pico-projector system is the PicoP™ projector engine developed by Microvision, Inc. The PicoP engine includes RGB laser sources, a micro-electro-mechanical system (MEMS) scanning mirror, optics and video processing electronics for receiving video data from a source and generating an image to be projected onto any viewing surface (e.g., a screen, a wall, a sheet of paper or a chair back). However, projection systems that use a MEMS scanning mirror face some unique technical problems that are not evident with other methodologies.

A conventional MEMS scanning mirror implemented in a pico-projection system is a two-dimensional scanning mirror that sweeps laser beams across a viewing surface similar to the vertical and horizontal sweep of an electron beam in a CRT-based television or monitor. The horizontal sweep is typically done at one of the resonant mode frequencies of the scanning mirror that is on the order of 18 kHz. Operating on a resonant mode allows maximum beam deflection with minimal input energy. Although the horizontal movement is sinusoidal, the image may be pre-warped by an image processor in order to compensate for the sinusoidal movement. The vertical sweep is generally desired to be an ideal saw tooth to provide a linear sweep movement from top-to-bottom with minimal retrace time, thus maximizing the allowable active video time. A typical MEMS may have a horizontal and vertical drive input and horizontal and vertical sensor outputs. Each sensor provides an electrical signal in proportion to mirror movement in that axis. In that way, the actual movement and/or position of the scanning mirror can be monitored and/or controlled.

Ideally, the MEMS scanning mirror would have only one resonant mode at the horizontal sweep frequency. As described, the resonant mode associated with horizontal sweep is beneficial. Unfortunately, the mirror has multiple resonant modes for both vertical and horizontal movement. The first mode typically falls inconveniently within the frequency spectrum occupied by the vertical drive.

While the horizontal drive is a narrow band signal, a sine wave, falling right on a resonant mode, the ideal vertical waveform is a saw tooth or a modified saw tooth. This wide-band waveform has harmonics extending to over 1 kHz, including some which will inevitably fall on or near the first mode of the MEMS scanner.

The high Q of the MEMS at its first mode will cause an accentuation of nearby frequency components about its vertical axis motion. This will distort the vertical sweep waveform, resulting in visible distortion of the raster image. To suppress these first mode oscillations in the vertical axis, various filtering methods such as low pass filters and/or notch filters may be employed. Similarly, the waveform may be created from a lookup table which is created with low pass and/or notch response.

Low pass and/or notch filtering may be employed with some degree of success. However, each has specific problems that are difficult to overcome, especially in a high volume manufacturing environment. Low pass filtering with adequate attenuation of the first mode may distort the vertical sweep waveform causing visible distortion at the top and/or bottom of the raster. Alternatively, the number of horizontal sweep lines may be reduced to avoid displaying this distorted region. Either result is undesirable.

Notch filtering has the ability to virtually eliminate first mode oscillations. Unfortunately, if the filter center frequency is even 1% different from the individual MEMS first mode frequency, unacceptable visible distortion of the raster image due to first mode oscillation will result. This makes implementation of a fixed frequency notch filter impractical in a high volume manufacturing environment.

BRIEF DESCRIPTION OF THE DRAWINGS

For a more complete understanding of this disclosure and its features, reference is now made to the following description, taken in conjunction with the accompanying drawings, in which:

FIGS. 15A-D are graphs illustrating spectral error for various notch filter settings;

FIG. 16C is a bode plot illustrating closed loop response according to one embodiment of the present disclosure;

FIG. 16D is a bode plot illustrating the MEMS drive according to one embodiment of the present disclosure;

DETAILED DESCRIPTION

FIGS. 1 through 19, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
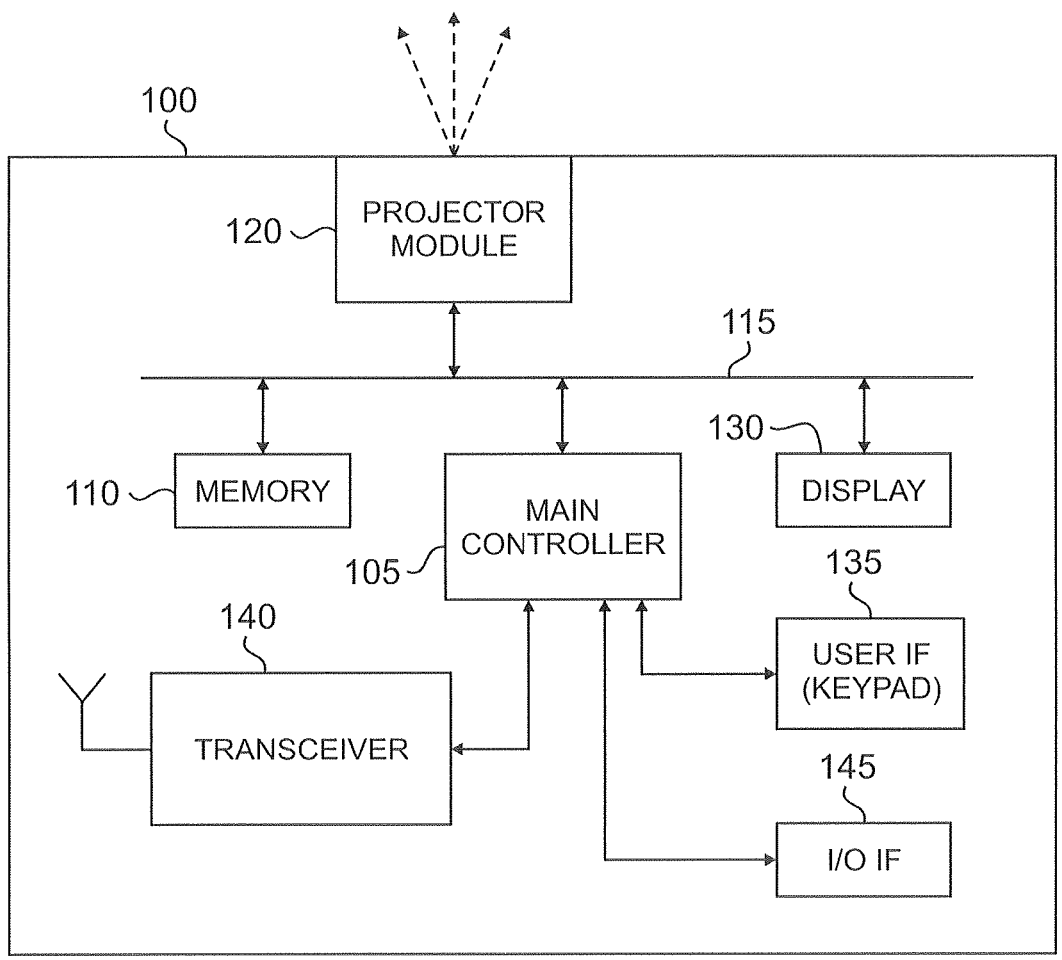
FIG. 1 is a block diagram of a mobile phone that includes a pico-projection system according to one embodiment of the present disclosure.

FIG. 1 is a high-level block diagram of a mobile phone 100, which includes an embedded pico-projection system according to one embodiment of the present disclosure. The mobile phone 100 is simply one particular embodiment of the present invention. Those skilled in the art will readily understand that the miniature projection system described herein may be embedded in other types of portable devices or may be implemented as a stand-alone device.

The illustrated mobile phone 100 comprises a main controller 105, a memory block 110, a communication bus 115, a projector module 120, a display block 130, a user interface (IF) 135, a transceiver 140 and an input-output interface (I/O IF) 145. The main controller 105 is the central processor that supervises the overall operation of the mobile phone 100. The memory block 110 may include one or more conventional read-only memory (ROM) devices and/or random access memory (RAM) devices (including a Flash RAM), as well as an optional removable memory card. The display block 130 may comprise typical LCD color display circuitry that is common to most mobile phones. The communication bus 115 enables the transfer of data between the main controller 105, the memory 110 and the display 130, as well as the projector module 120.

The projector module 120 is a pico-projector device that uses, for example, three laser diodes (red, green and blue) to project an image onto any suitable surface, such as a wall, a screen, a sheet of paper, a desktop, or the like. The main controller 105 controls the projector module 120 in response to user commands that may be received via the user IF 135 or external commands that may be received via the transceiver 140. By way of example, a user may enter commands that cause the main controller 105 to retrieve a slide show presentation file from the memory 110 and to display the slides via the projector module 120 and/or the display block 130.

Figure 2:
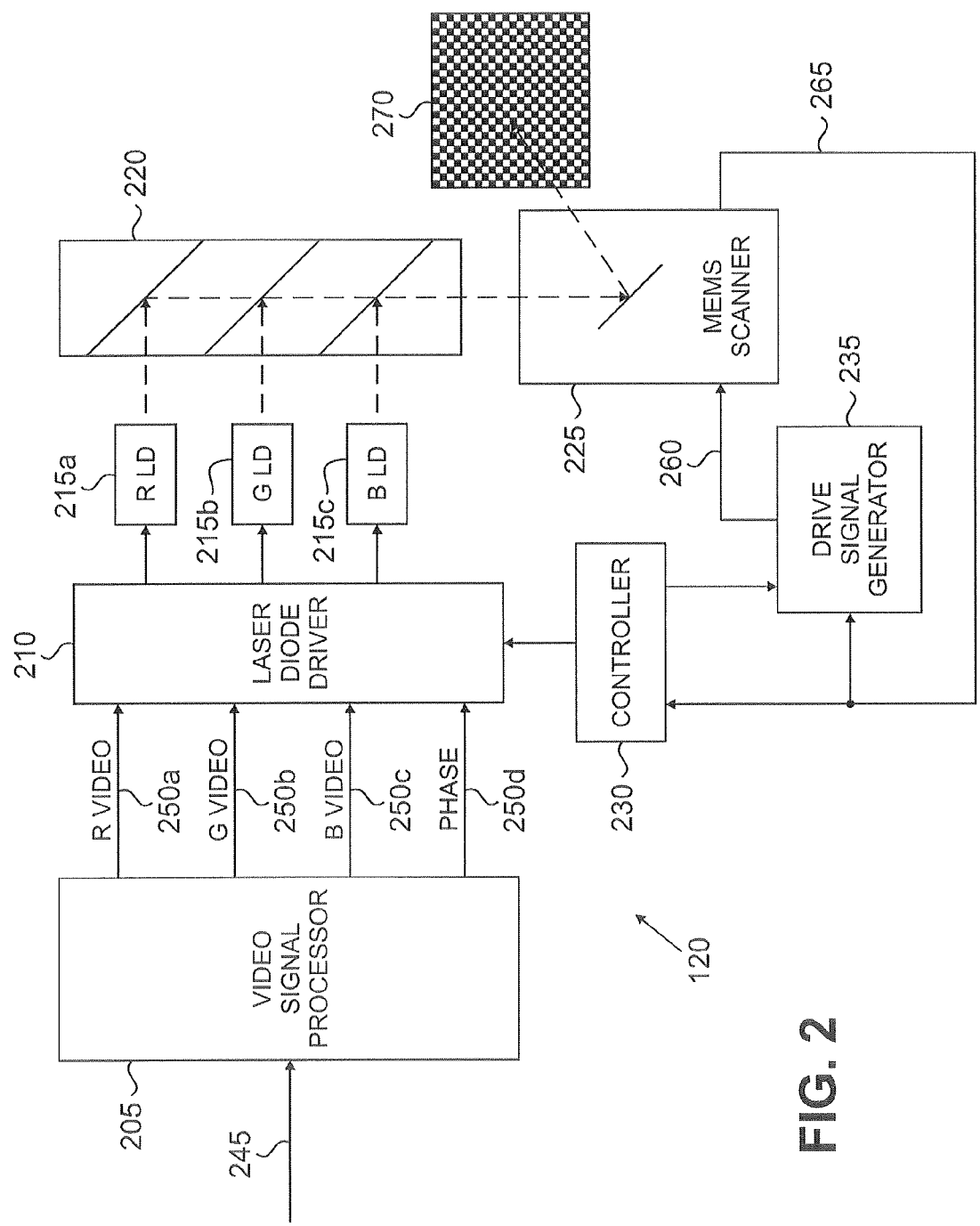
FIG. 2 is a block diagram of selected portions of the projector module of FIG. 1 according to one embodiment of the present disclosure.

FIG. 2 is a block diagram of selected portions of the projector module 120 according to one embodiment of the present disclosure. For the illustrated embodiment, the projector module 120 comprises a video signal processor 205, a laser diode driver 210, a red laser diode (R LD) 215a, a green laser diode (G LD) 215b, a blue laser diode (B LD) 215c, combiner optics 220, a MEMS scanner with integrated sensors 225, a controller 230 and a drive signal generator 235.

The MEMS scanner 225 performs optical steering of the LASER beams provided by the combiner optics 220 to form a two-dimensional raster image 270. As described in more detail below, the present disclosure provides a mechanism for suppressing undesirable oscillations in the MEMS scanner 225. The disclosed embodiments are essentially tunable notch filters. For one embodiment, the MEMS vertical drive and sensor are placed in a phase-compensated feedback loop in order to provide a self-tuning notch filter that precisely removes the undesirable first mode oscillations. Another embodiment employs a tunable notch filter mechanism with feedback and suitable signal processing to determine the ideal filter setting.

The controller 230 generates control signals for the drive signal generator 235 and feeds back scanner position information to the video signal processor 205. The control signals may be generated partly based on a sensor signal 265 received by the controller 230 from the scanner sensor of the MEMS scanner 225, which is capable of sensing position and/or movement information related to the MEMS scanner 225. The drive signal generator 235 is capable of generating horizontal and vertical drive signals 260 that cause the MEMS scanner 225 to sweep the light beam that is output by the combiner optics 220 across a viewing surface in order to generate the two-dimensional raster image 270.

Figure 3:
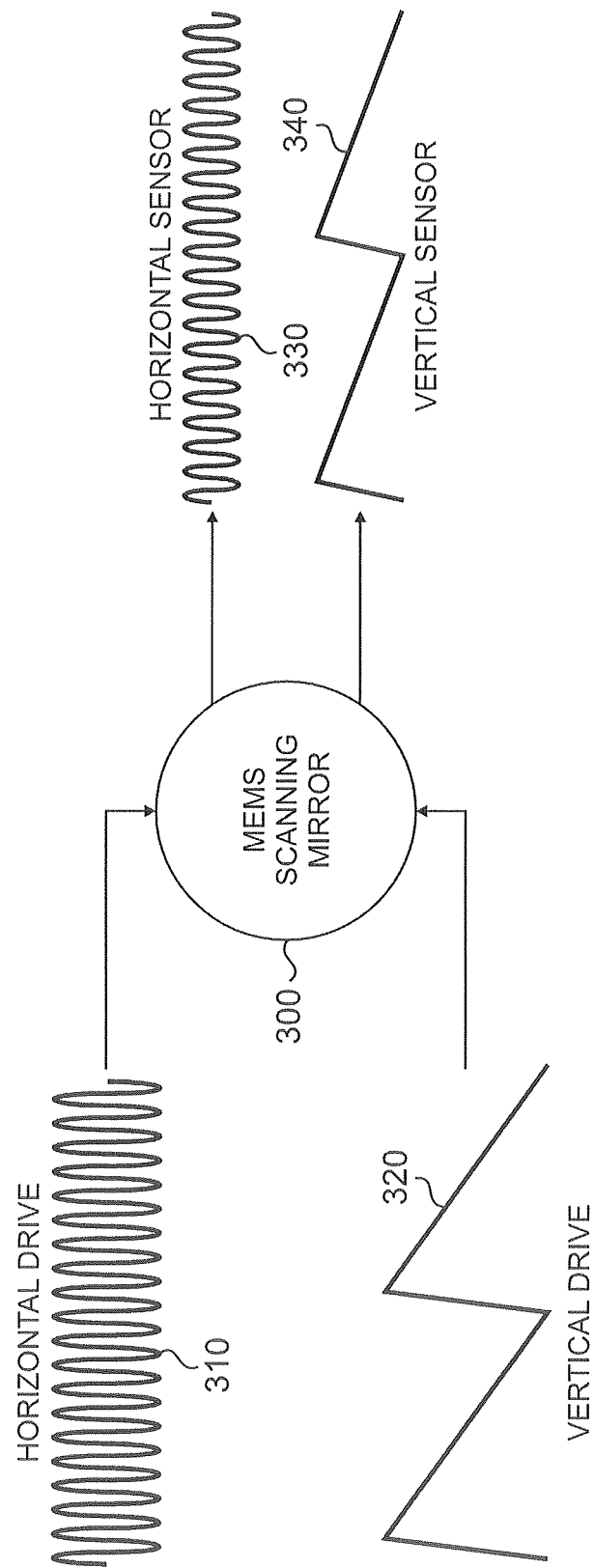
FIG. 3 is a block diagram of a MEMS scanning mirror showing typical drive and sensor waveforms according to one embodiment of the present disclosure.

FIG. 3 is a block diagram of a MEMS scanning mirror 300 showing typical drive and sensor waveforms according to one embodiment of the present disclosure. For the illustrated embodiment, a horizontal drive signal 310 and a vertical drive signal 320 excite the mechanical motion of the MEMS scanner 225. The drive signals 310 and 320 may be applied separately, as shown, or in any other suitable manner. For example, alternative methods may include using a drive signal comprising the composite of the signals 310 and 320 or composite differential of the signals 310 and 320. Integral sensors (e.g., transducers) may convert the mechanical motion and/or position of the MEMS scanning mirror 300 into electrical signals for movement and/or position. For the illustrated embodiment, the sensor signals 330 correspond to horizontal axis movement and/or position and the sensor signals 340 correspond to vertical axis movement and/or position.

Figure 4:
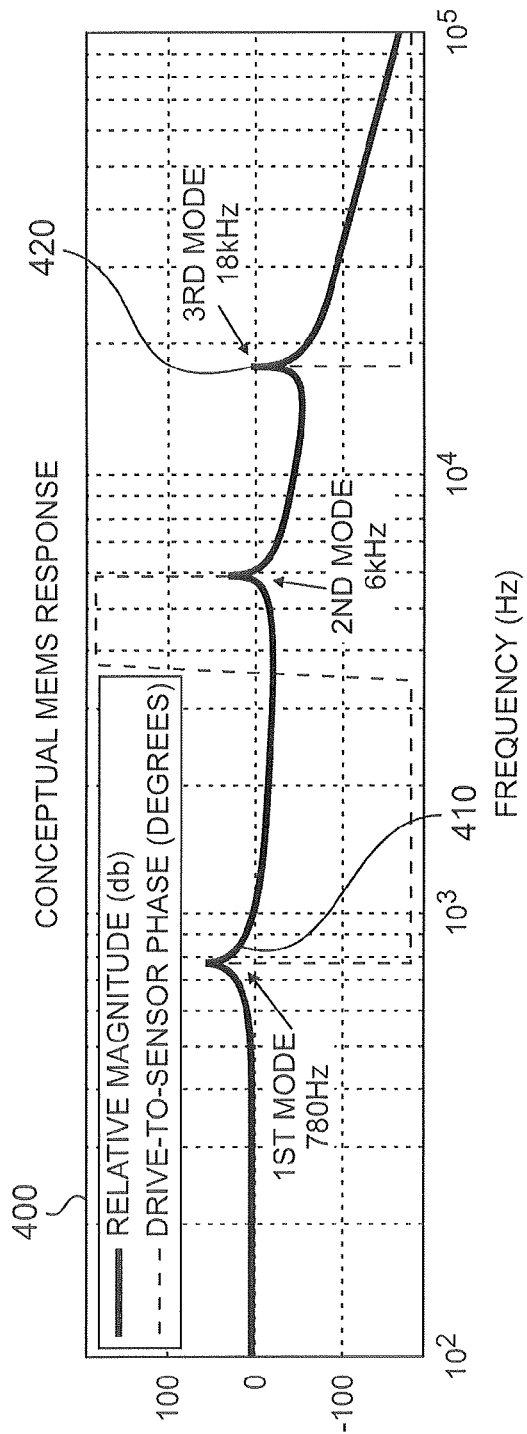
FIG. 4 is a graph illustrating a simplified conceptual MEMS response for various resonant modes according to one embodiment of the present disclosure.

FIG. 4 is a graph 400 illustrating a simplified conceptual MEMS response for various resonant modes according to one embodiment of the present disclosure. This gain/phase plot 400 illustrates three resonant modes. An actual physical MEMS scanner 225 may have many more resonant modes. The first mode 410 in this example is at 780 Hz. As will be further described, the first mode 410 lies within the frequency range occupied by the vertical drive spectra and has mechanical response in the vertical axis. The third mode 420 in this example is at 18 kHz and has response in the horizontal axis. In this example, the third mode 420 is useful for horizontal sweep, while the first mode 410 is an artifact that interferes with vertical sweep.

Various means within the controller 230 and the drive signal generator 235 may be employed to match the frequency of the horizontal drive signal 310 to the appropriate MEMS resonant mode 420. A more accurate match results in better horizontal drive-to-angular motion efficiency of the scanner 225.

Typically, the fundamental vertical drive frequency of the vertical drive signal 320 will be a fixed integer quotient of the horizontal frequency. For example, the vertical drive frequency may be the horizontal frequency divided by 300. This scheme allows a fixed number of lines per raster frame. In the example MEMS response shown in the graph 400, the horizontal sweep would be 18 kHz and the vertical sweep could be, for example, 60 Hz. In a display requiring 480 lines, bidirectional horizontal sweep allows an entire raster in 240 horizontal cycles, which amounts to 13.33 ms.

Figure 5:
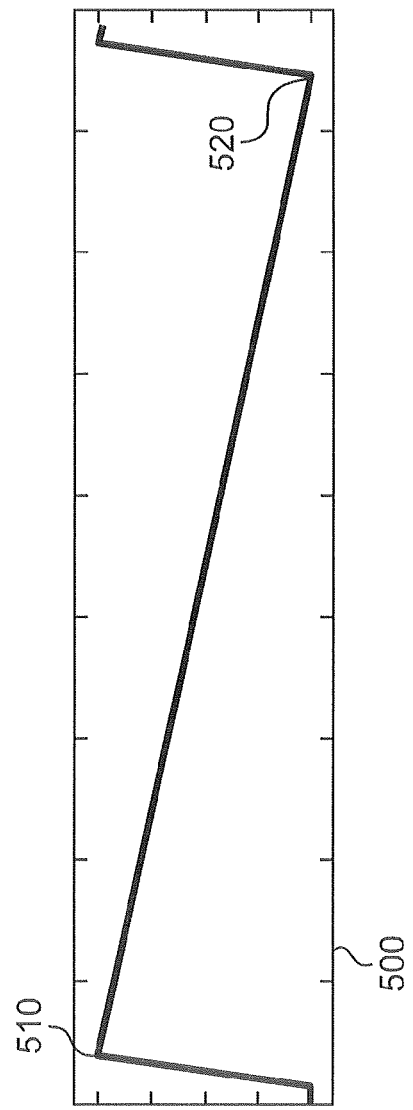
FIG. 5 is a graph illustrating an unfiltered "perfect" saw tooth waveform.

FIG. 5 is a graph 500 illustrating an unfiltered "perfect" saw tooth waveform. For this illustrated example, the saw tooth waveform has a 1/32 rise time and a 31/32 fall time. This results in a potential linear sweep region from a high point 510 to a low point 520 of 16.15 ms, which exceeds the requirement of 13.33 ms for the above-described example.

Figure 6:
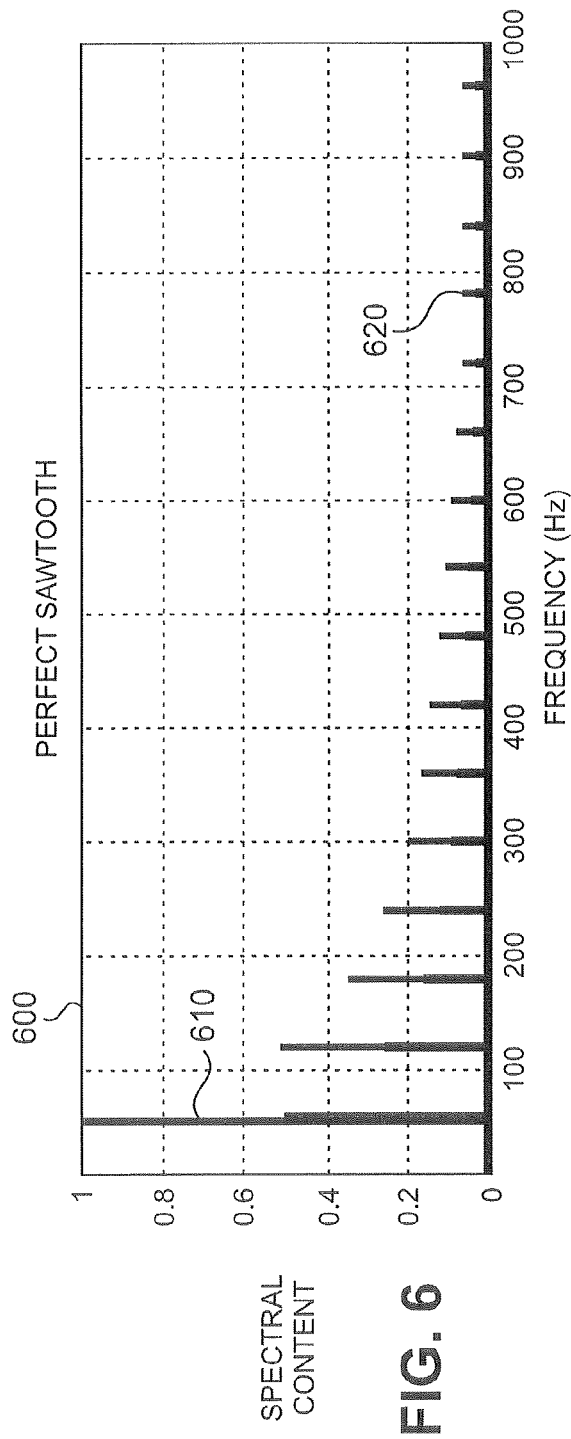
FIG. 6 is a graph illustrating FFT derived spectral content of the "perfect" saw tooth waveform of FIG. 5.

FIG. 6 is a graph 600 illustrating FFT derived spectral content of the "perfect" saw tooth waveform shown in the graph 500 of FIG. 5. The 60 Hz fundamental 610 is evident, but a strong harmonic component 620 at 780 Hz is also evident. This is identical to the first mode frequency 410 shown in the graph 400 of FIG. 4. In this worst case example, the harmonic stimulating the offending MEMS first mode response lies directly over the top of the first mode. However, with a 60 Hz sweep frequency, the nearest harmonic will be no farther than 30 Hz from the first mode in a best case condition.

Figure 7:
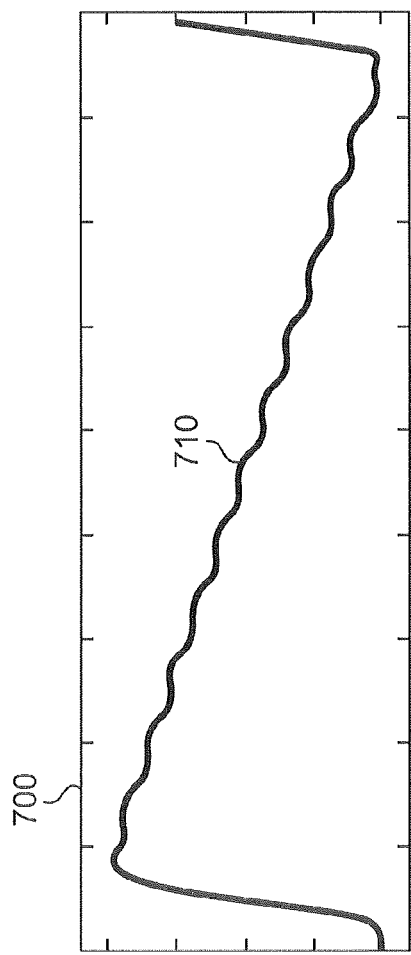
FIG. 7 is a graph illustrating a simulated vertical sensor waveform for the MEMS scanning mirror of FIG. 3 with inadequate first mode suppression.

FIG. 7 is a graph 700 illustrating a simulated vertical sensor waveform for the MEMS scanning mirror 300 with inadequate first mode suppression. As seen in the graph 700, this waveform shows evidence of first mode oscillation 710. In this simulated scenario, a notch filter was applied to the waveform of FIG. 5 prior to the MEMS scanner 225. However, the notch center frequency was set 0.2% higher than the 780 Hz first mode frequency. Consequences of this slightly imperfect filtering are evident in the oscillation 710.

Figure 8:
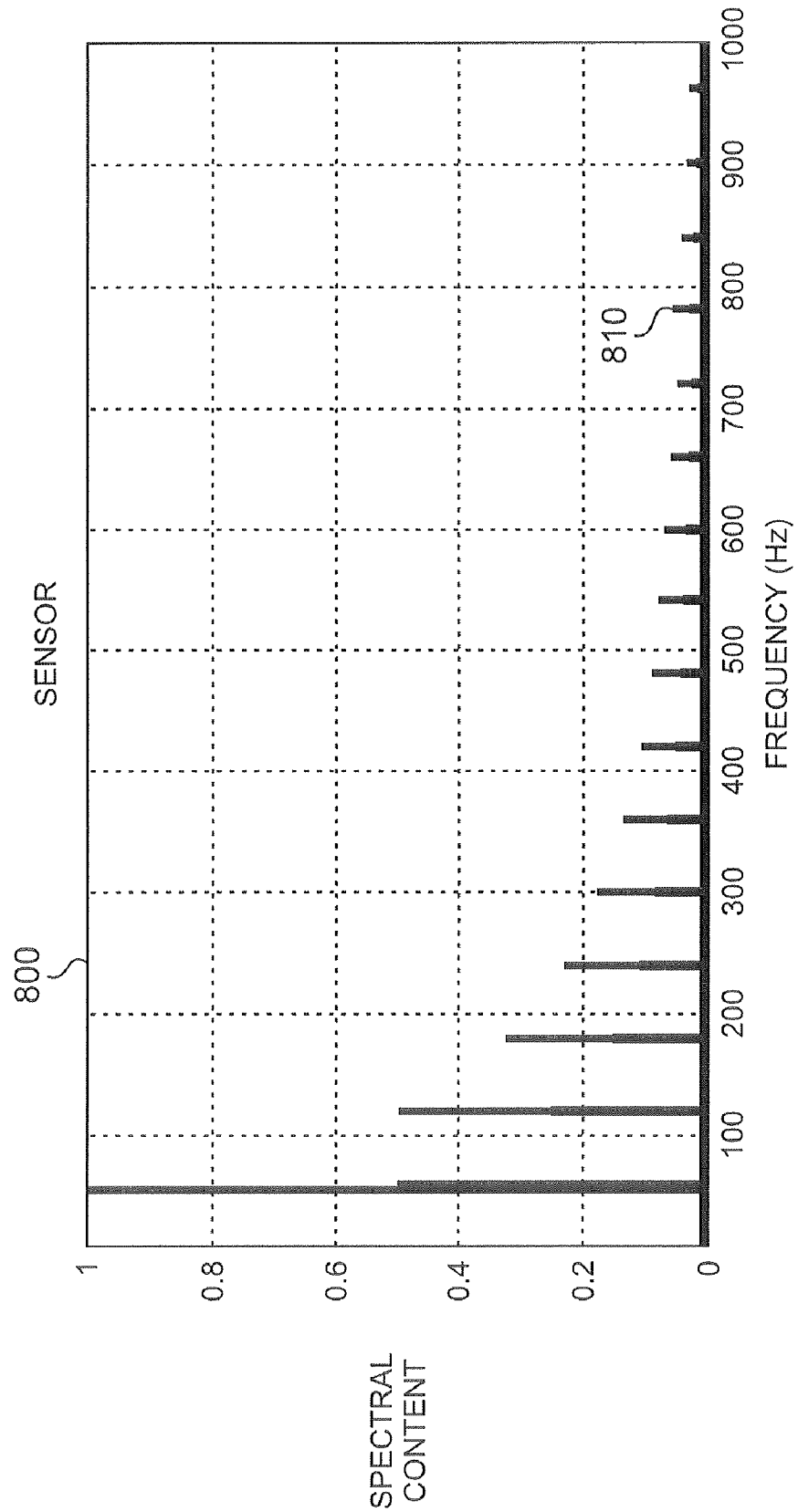
FIG. 8 is a graph illustrating FFT derived spectral content of the sensor waveform of FIG. 7.

FIG. 8 is a graph 800 illustrating FFT derived spectral content of the sensor waveform shown in the graph 700 of FIG. 7. A harmonic 810, which falls over the first mode, is slightly elevated above the next lower frequency harmonic. This is a deviation from a normal saw tooth spectra, which decreases at 6 db per octave.

Figure 9:
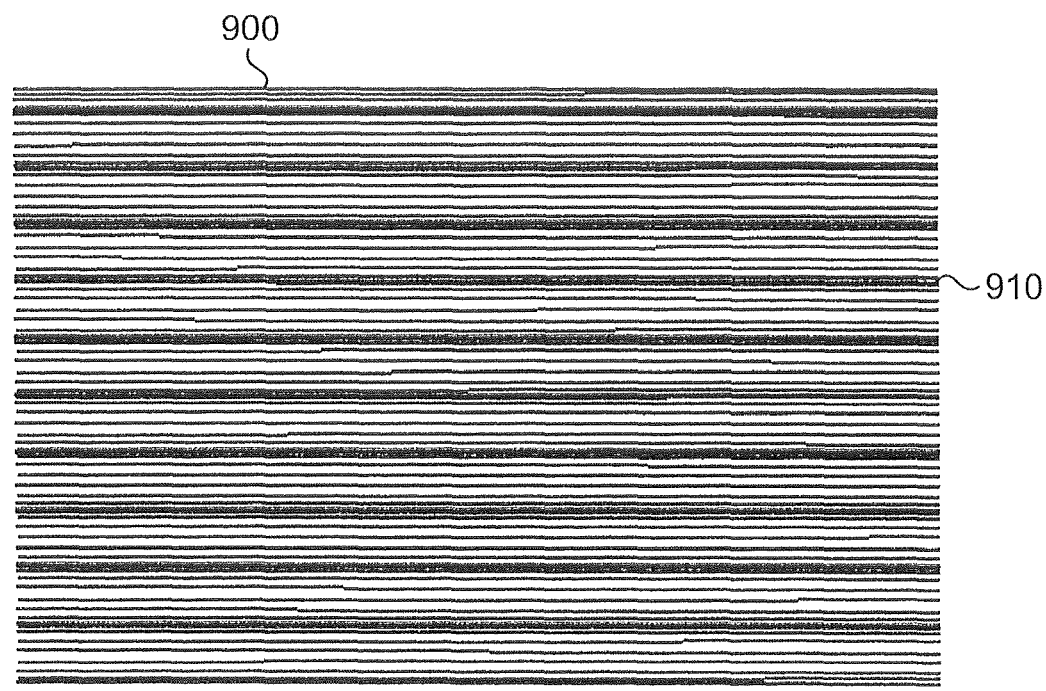
FIG. 9 is a raster plot, derived from the drive scenario of FIGS. 7 and 8, that shows first mode distortion.

FIG. 9 is a raster plot 900, derived from the drive scenario of FIGS. 7 and 8, that shows first mode distortion 910. Although aberrations at 710 and 810 seemed minor, significant first mode distortion 910 is evident in the raster plot 900. It is evident that maintaining MEMS manufacturing tolerances to much less than 0.2% is not practical; therefore, the fixed notch solution is not a practical one for high volume production.

Figure 10:
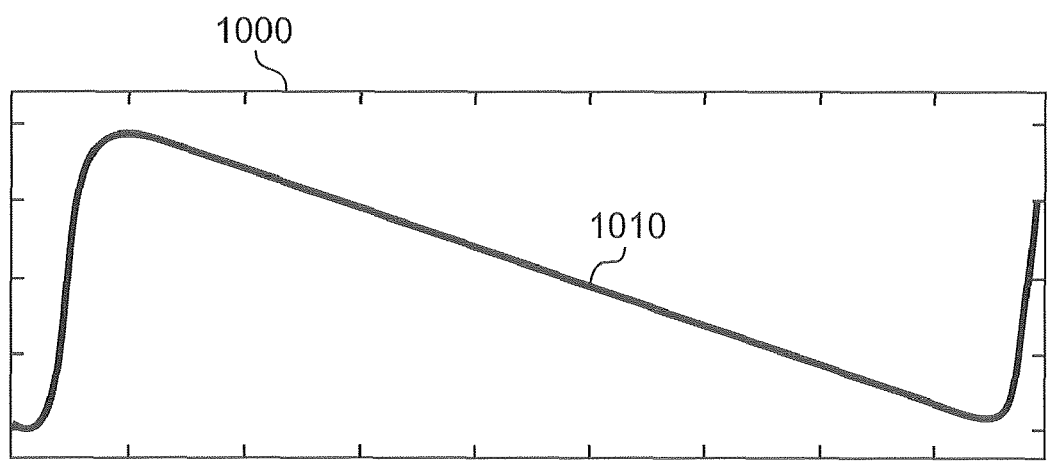
FIG. 10 is a graph illustrating a simulated vertical sensor waveform for the MEMS scanning mirror of FIG. 3 with adequate first mode suppression according to one embodiment of the present disclosure.

FIG. 10 is a graph 1000 illustrating a simulated vertical sensor waveform 1010 for the MEMS scanning mirror 300 with adequate first mode suppression according to one embodiment of the present disclosure. For this example, the notch filter frequency is set exactly to the first mode frequency. Filter Q is equivalent to the MEMS first mode Q. As seen in the graph 1000, no first mode oscillations are evident in the waveform 1010.

Figure 11:
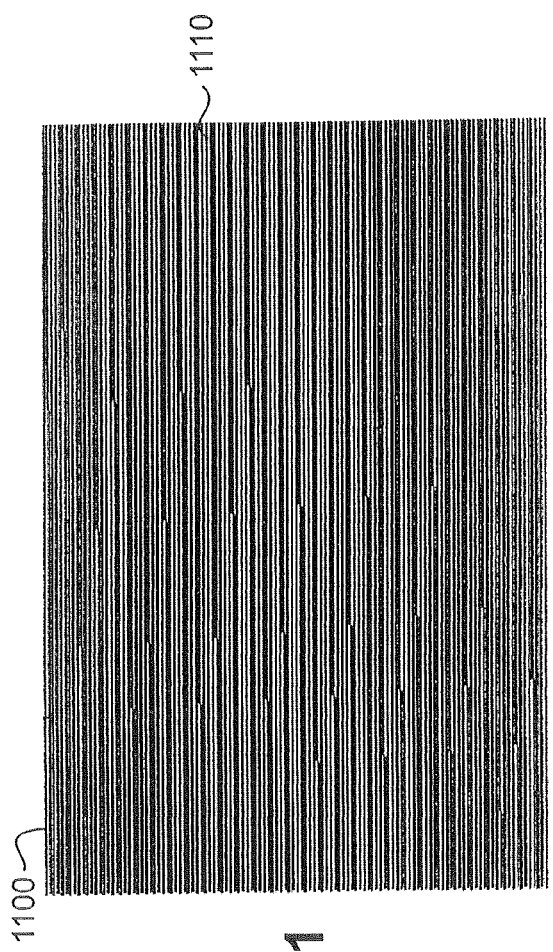
FIG. 11 is a raster plot, derived from the drive scenario of FIG. 10, that is uniform and shows no distortion according to one embodiment of the present disclosure.

FIG. 11 is a raster plot 1100 derived from the drive scenario of FIG. 10. This raster plot 1100 is uniform and shows no distortion 1110 according to one embodiment of the present disclosure. Thus, when the notch filter frequency exactly matches the first mode frequency, no first mode distortion 1110 is evident.

Figure 12:
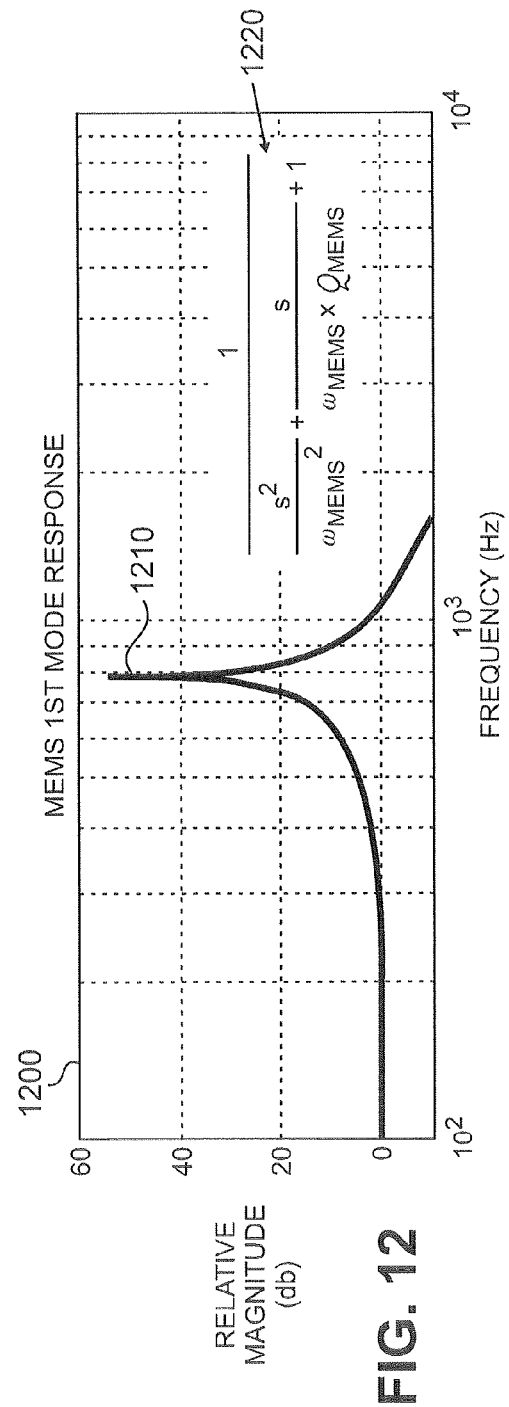
FIG. 12 is a graph illustrating the first mode response of the MEMS scanner of FIG. 2 according to one embodiment of the present disclosure.

FIG. 12 is a graph 1200 illustrating the first mode response 1210 of the MEMS scanner 225 according to one embodiment of the present disclosure. This response 1210 is modeled using a two-pole transfer function MEMS at a first mode of 780 Hz and $Q_{MEMS}$ of 500.

Figure 13:
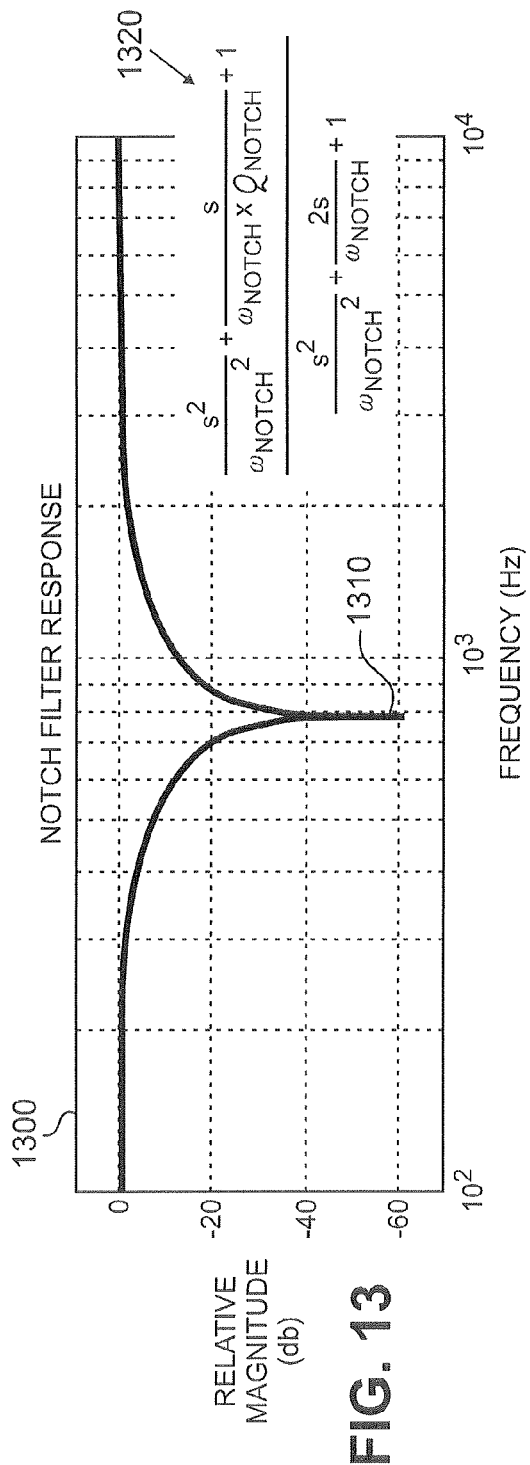
FIG. 13 is a graph illustrating a notch frequency corresponding identically to the first mode response of FIG. 12 according to one embodiment of the present disclosure.

FIG. 13 is a graph 1300 illustrating a notch frequency 1310 corresponding identically to the first mode response 1210 in the graph of FIG. 12 according to one embodiment of the present disclosure. For this example, a transfer function 1320 with an NOTCH center frequency of 780 Hz and $Q_{NOTCH}$ of 500 is used.

For the particular example as illustrated in FIGS. 10-13, the first mode frequency is 780 Hz with a Q of 500. This combination (MEMS NOTCH and $Q_{MEMS}=Q_{NOTCH}$) yields a virtually perfect vertical motion response in simulations. Simulations also show that results are much less sensitive to notch filter Q ($Q_{NOTCH}$) than to notch center frequency NOTCH). These ideal results correspond to one embodiment of the present disclosure, which comprises an adaptive tunable notch filter that will be described further below.

Differing mathematical representations may be substituted for the transfer functions 1220 and 1320. The illustrated example results in an approximate two-pole response of the resulting sensor signal 265 starting at the notch frequency. At lower first mode frequencies, this may cause distortion at the top and bottom of the raster due to excessive bandwidth limiting of the MEMS drive. Alternate transfer functions for the notch could include those that, when combined with the MEMS response, result in single-pole attenuation or even flat response, for example.

For the embodiment in which the tunable notch filter is an adaptive tunable notch filter, the notch filter has a center NOTCH) that is adaptively tuned to coincide to the MEMS first mode frequency MEMS) with a high degree of accuracy. Likewise, it is desirable to match the Q (bandwidth) of the notch filter to that of the MEMS first mode, but in practice it may be acceptable to set $Q_{NOTCH}$ to a nominal value.

Figure 14:
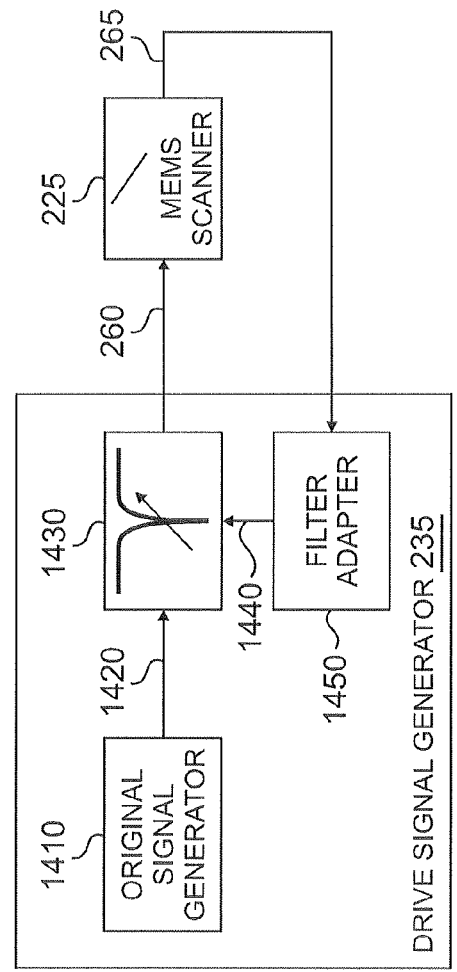
FIG. 14 is a block diagram of the feedback loop from the MEMS scanner to the drive signal generator of FIG. 2 according to one embodiment of the present disclosure.

FIG. 14 is a block diagram of the feedback loop from the MEMS scanner 225 to the drive signal generator 235 according to one embodiment of the present disclosure. For this embodiment, the drive signal generator 235 comprises an original signal generator 1410, a tunable notch filter 1430, and a filter adapter 1450. Tunable and/or adaptive tunable notch filters have been used widely in communications and instrumentation to eliminate unwanted interference frequencies.

However, the drive signal generator 235 uniquely implements an adaptive notch filter 1430 to precisely counteract the undesirable response of the MEMS scanner 225 (e.g., transducer) in the first mode. In other words, the adaptive notch filter 1430 does not attenuate an offending signal. Instead, the filter 1430 compensates for an offending transducer response in the MEMS scanner 225.

Various discrete time or continuous time tunable notch filters may be employed to achieve these results. Physical filter size is a discrete time filter advantage at the relatively low first mode frequency. More important for adaptive filtering, discrete time filters are precisely programmable and repeatable.

The filter adapter 1450 may implement one of various adaptive filtering algorithms to control the tunable notch filter 1430. Adaptive filtering is an extensive field of its own. An example is the Widrow-Hoff Least Means Squared Filter (LMS), invented in 1960 by Stanford University professor Bernard Widrow and Ted Hoff. Exploration of the LMS filter or other various adaptive algorithm possibilities is outside the scope of this disclosure.

For this embodiment, there are several considerations in choosing the adaptive process to be implemented by the filter adapter 1450. Because the original signal generator 1410 generates a waveform 1420 (such as the saw tooth waveform 500 or other similar waveform) to be applied to the tunable notch filter 1430, the exact harmonic frequencies are always known. Also, the ideal spectra (such as spectra 600) are known. However, the frequency and magnitude of the MEMS first mode response are unknown.

Knowledge of the fundamental and harmonic frequencies allows quadrature sampling of the sensor signal 265 at those specific frequencies, within the frequency range of interest. The frequency range would be selected to include, at minimum, the harmonic above and below the notch frequency. The filter adapter 1450 compares derived spectral content to the expected spectral content and, based on the comparison, generates an error signal 1440, which can be used to tune the notch filter 1430.

FIGS. 15A-D are graphs illustrating spectral error for various notch filter settings. For the purpose of these simulations, the MEMS first mode frequency is set to 750 Hz, which is between waveform harmonics. The error signals are derived by subtracting the actual spectra from the expected spectra after some amplitude normalization.

While FIGS. 15A-D are based on FFT-derived spectra of the sensor signal 265, it is nevertheless instructive of how spectra derived from quadrature sampling at harmonic frequencies provide information used to tune the notch filter 1430. The primary relevant difference is that spectra 1530, 1550 and 1570, all at 750 Hz, would not exist since there would be no samples taken at those frequencies.

The spectral error graph 1500 has no error, indicating that the notch filter 1430 is precisely set. The spectral error graph 1520, which is simulated with the notch frequency 1% lower than the MEMS first mode frequency, shows spectra 1535 greater than spectra 1525, indicating that the notch is to be moved to a higher frequency. The spectral error graph 1540, which is simulated with the notch frequency 1% higher than the MEMS first mode frequency, shows spectra 1555 less than spectra 1545, indicating that the notch is to be moved to a lower frequency. The spectral error graph 1560, which is simulated with the notch frequency 0.1% lower than the MEMS first mode frequency, shows spectra 1575 greater than spectra 1565, indicating that the notch is to be moved to a higher frequency.

FIGS. 15A-D demonstrate that information is available to tune the notch filter 1430 in the desired direction, allowing various feedback schemes to be employed by the filter adapter 1450. Other methods for deriving a suitable error signal 1440 may also be employed. The filter adapter 1450 may use this signal 1440 to tune the notch filter 1430, thus suppressing first mode oscillation effects in the MEMS scanner 225.

For another embodiment described below in connection with FIGS. 16-19, the MEMS scanner 225 is included in a feedback loop so that its drive becomes roughly the inverse of its first mode response. This inverse response is the functional equivalent of the adaptive tunable notch filter 1430 described of the above-described embodiment. Thus, this second embodiment provides all the advantages of the adaptive tunable notch filter 1430 without the need for a complex algorithm (implemented by the filter adapter 1450) to achieve perfect tuning.

FIGS. 16A-D are bode plots relating to this second embodiment of the present disclosure. Since the MEMS scanner 225 is in a feedback loop for this embodiment, the gain and phase of the first mode are considered so that the loop may be compensated for stability.

Figure 16A:
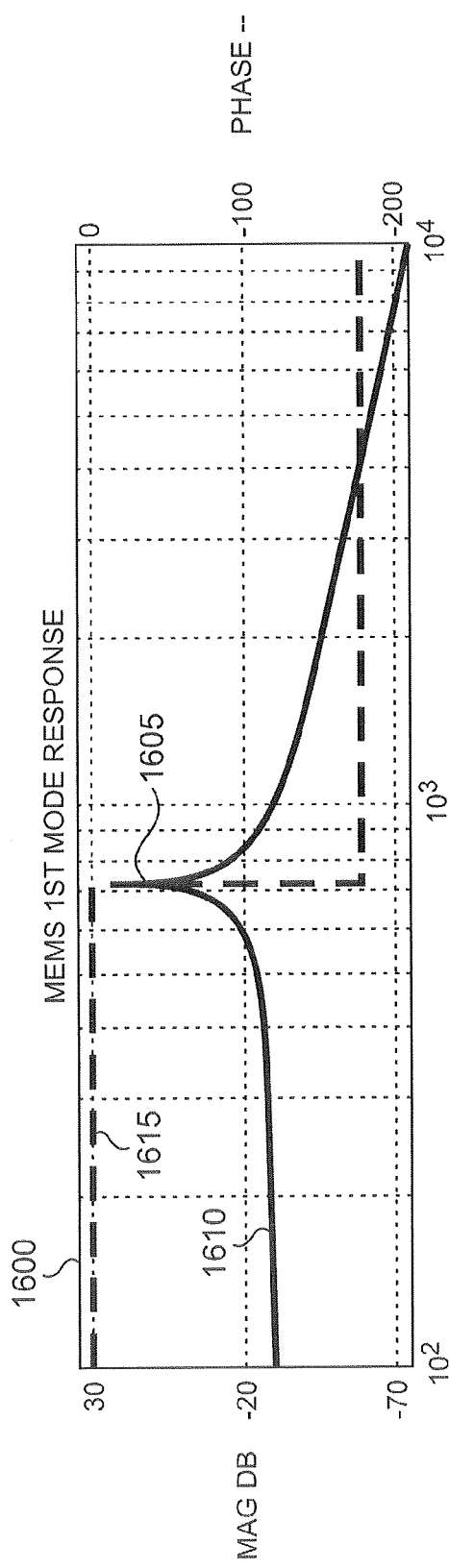
FIG. 16A is a bode plot illustrating gain phase of the MEMS first mode according to one embodiment of the present disclosure.

FIG. 16A is a bode plot 1600 illustrating gain phase of the MEMS first mode according to one embodiment of the present disclosure. The bode plot 1600 represents a MEMS scanner 225 with first mode Q of 300 and frequency of 720 Hz. This corresponds to a peak response 1605 of +49.5 db over the baseline, which is at −29.5 db, resulting in a peak first mode response 1605 of 20 db. Baseline magnitude is the drive-to-sensor transfer function of the MEMS scanner 225. It takes into account the electrical-to-mechanical transducer function of drive-to-mirror movement, as well as mechanical-to-electrical transducer function of mirror movement-to-sensor signal. The exact baseline magnitude relationship may vary for various MEMS designs, and even unit-to-unit, due to manufacturing variation.

The drive-to-sensor phase response is −90° at the first mode peak 1605. The relationship is expected to remain constant, though some MEMS sensor scenarios may alter this relationship. If so, the phase compensation, which will be further explained, are modified to ensure loop stability and first mode suppression.

Figure 16B:
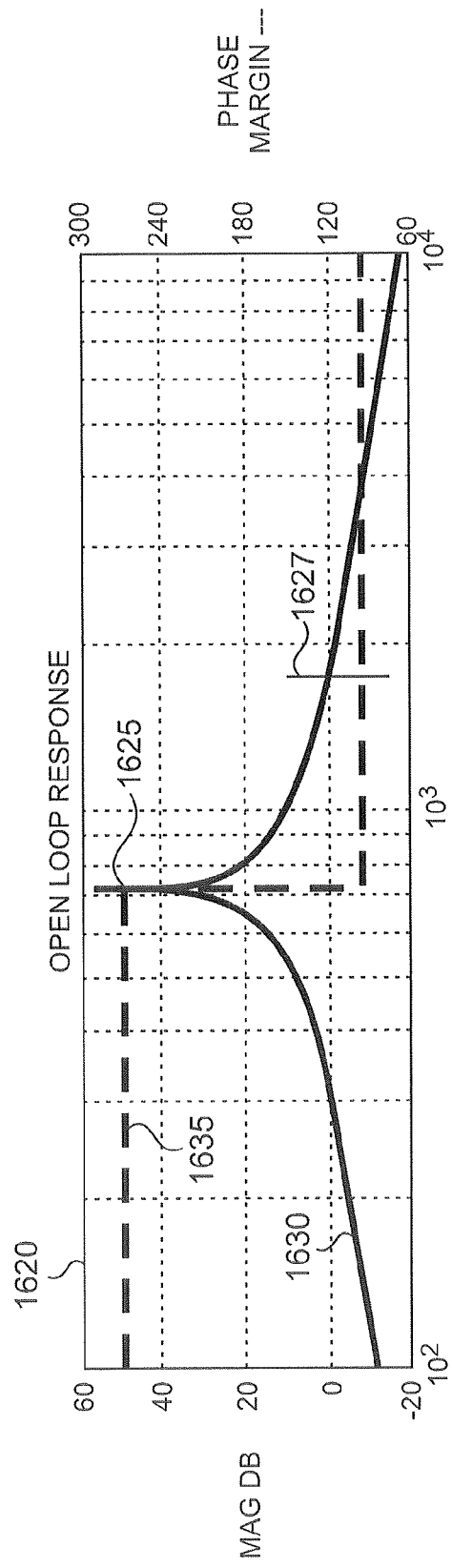
FIG. 16B is a bode plot illustrating open loop gain and phase margin according to one embodiment of the present disclosure.

FIG. 16B is a bode plot 1620 illustrating open loop gain and phase margin according to one embodiment of the present disclosure. The bode plot 1620 illustrates ideal open loop response with gain plot 1630 and phase margin plot 1635 with gain. This response is achieved via gain and phase compensation applied to the response of 1600. Ideal first mode suppression is achieved when gain is exactly $2Q_{MEMS}$ at the first mode peak 1625, and phase margin is exactly 180° at the first mode frequency 1625. The phase margin 1627 of 90° insures stability.

Figure 17:
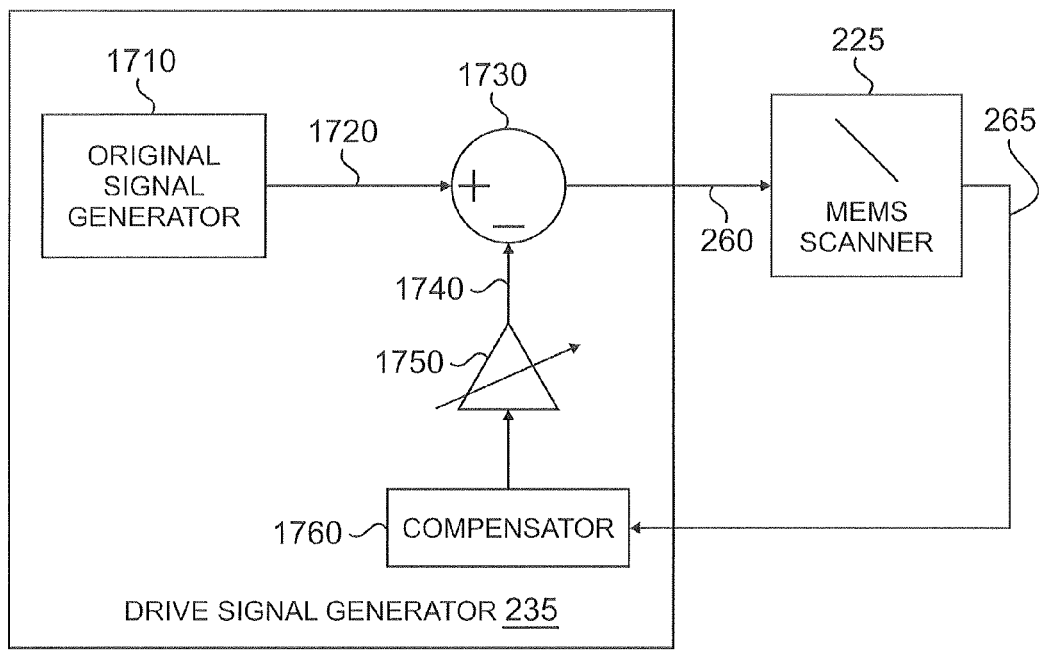
FIG. 17 is a block diagram of the feedback loop from the MEMS scanner to the drive signal generator of FIG. 2 according to another embodiment of the present disclosure.

FIG. 17 is a block diagram of the feedback loop from the MEMS scanner 225 to the drive signal generator 235 according to the second embodiment of the present disclosure. For this embodiment, the drive signal generator 235 is configured to achieve a self-tuning notch filter drive at signal 260 using the MEMS scanner 225 first mode response at sensor signal 265, in conjunction with an adder 1730, an adjustable gain 1750 and a compensator 1760. In the result graph 1620, a 90° phase boost is achieved with a feedback consisting of a pure derivative phase boost 1760 with open loop feedback gain of $2Q_{MEMS}$ (55.6 db) set with adjustable gain 1750. Open loop gain is determined by disconnecting the signal 1740 from the adder 1730 and by driving at the signal 1720 with a resulting open loop signal 1740.

For the simulation graphs of FIGS. 16A-D, the adjustable gain 1750 is set as follows: gain required $2Q_{MEMS}$ is +55.6 db. The pure derivative compensator 1760 gain of MEMS is +73.1 db. The MEMS scanner 225 first mode gain is +20 db. Thus, 55.6 db−73.1 db−20 db=−37.5 db for an adjustable gain 1750.

Adequate stability can be achieved at significantly less than 90° phase margin 1627. For example, a pole at higher frequency, such as 7 kHz, would tend to degrade the phase margin 1627 but would still leave adequate phase margin for stability. Adequate first mode suppression can be achieved when open loop gain falls in the range of approximately 20 $LOG(2Q_{MEMS})\pm3$ DB. A phase margin of 180° at the first mode frequency is ideal but somewhat less is acceptable. Care should be taken to minimize phase boost degradation at the first mode frequency.

FIG. 16C is a bode plot 1640 illustrating closed loop response according to one embodiment of the present disclosure, and FIG. 16D is a bode plot 1660 illustrating the MEMS drive according to one embodiment of the present disclosure.

The bode plot 1660 shows the closed loop drive signal 260 of FIG. 17 applied to the MEMS scanner 225. The notch 1665 is at exactly the first mode resonant frequency of peak response 1605. Since this notch 1665 is actually created with the first mode response of the MEMS scanner 225, the notch 1665 moves with temperature variations, manufacturing variations and/or design variations.

Figure 18A:
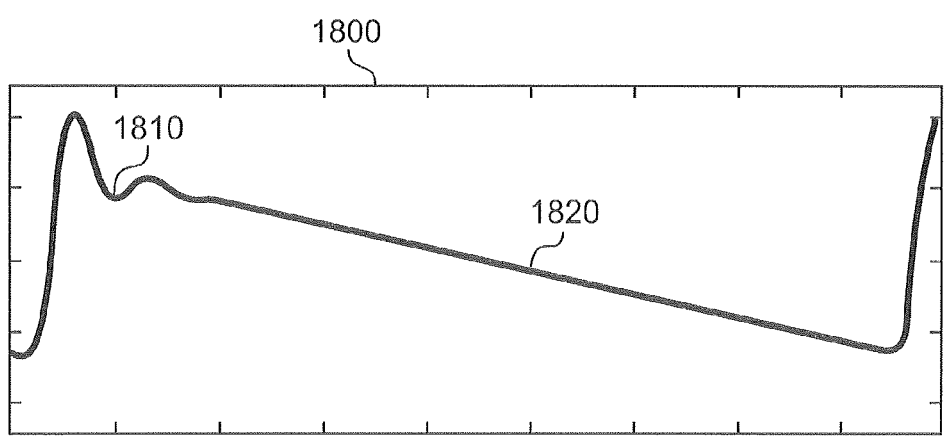
FIGS. 18A-C are simulated sensor waveforms showing the effect of gain adjustments in the feedback loop of FIG. 17 according to one embodiment of the present disclosure.
Figure 18B:
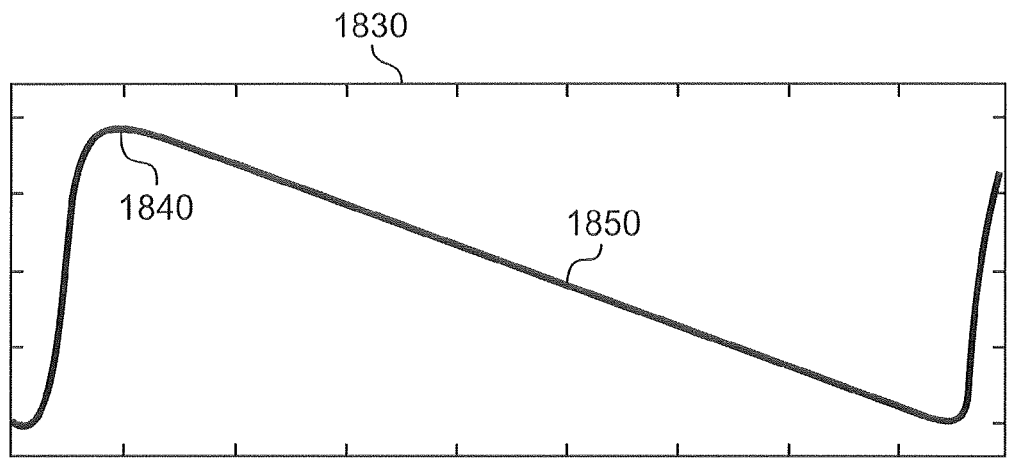
Figure 18C:
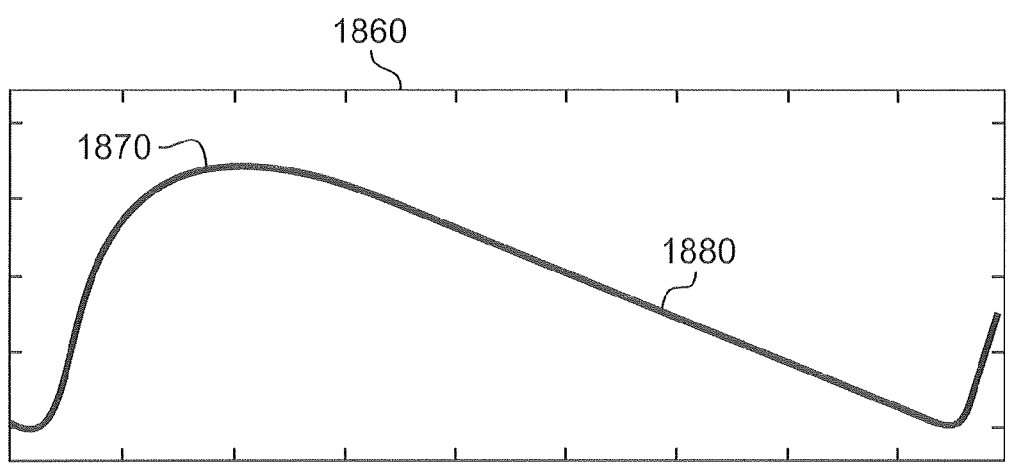
Figure 19A:
FIGS. 19A-C are simulated raster diagrams showing the effect of gain adjustments in the feedback loop of FIG. 17 according to one embodiment of the present disclosure.
Figure 19B:
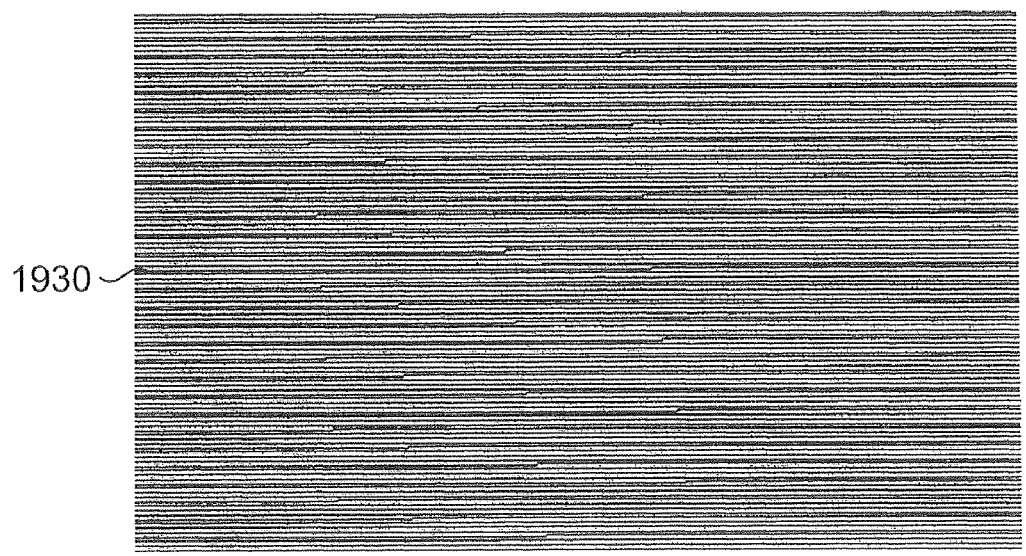
Figure 19C:

FIGS. 18A-C and 19A-C show the effect of proper adjustment of the gain 1750 of FIG. 17. FIGS. 18A-C are simulated sensor waveforms showing the effect of gain adjustments in the feedback loop of FIG. 17 according to one embodiment of the present disclosure. FIGS. 19A-C are simulated raster diagrams showing the effect of gain adjustments in the feedback loop of FIG. 17 according to one embodiment of the present disclosure.

The waveform 1800 is a simulation with the adjustable gain 1750 set to 10 db lower than ideal. Under-damping resulting in first mode ringing 1810 reduces the linear sweep time 1820 available for an undistorted raster. This results in visible first mode distortion 1910 of the raster 1900, as shown in FIG. 19A.

The waveform 1830 is a simulation with the adjustable gain 1750 set to its ideal value, as described above. Critical damping 1840 maximizes the linear sweep time 1820 available for an undistorted raster. This results in the perfectly formed raster 1930 of FIG. 19B.

The waveform 1860 is a simulation with the adjustable gain 1750 set to 10 db higher than ideal. Over-damping resulting in rounding 1870 reduces the linear sweep time 1880 available for an undistorted raster. This results in visible rounding distortion 1970 of the raster 1960, as shown in FIG. 19C.

Adjustment of the adjustable gain amplifier 1750 may be implemented in any suitable manner. For example, the gain adjustment may be automated into the design so that the projector module 120 adjusts itself, the gain may be adjusted at manufacturing time by automated pattern and/or waveform recognition, or the gain may be roughly adjusted "by design" with the end user given the ability to provide fine adjustments. As another alternative, the gain may be adjusted by deterministically tracking the Q of the MEMS scanner 225 and using the tracked Q to set the gain at manufacturing time based on a tabular or closed-form solution.

In order to give a more intuitive understanding of the methodology, most of this disclosure has been in reference to continuous time representations. However, both the adaptive tunable notch filter 1430 and the self-tuned notch filter of FIG. 17 may also be realized with mixed signal discrete time implementations.

It may be advantageous to set forth definitions of certain words and phrases used within this patent document. The term "couple" and its derivatives refer to any direct or indirect communication between two or more components, whether or not those components are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The term "each" means every one of at least a subset of the identified items. The phrases "associated with" and "associated therewith," as well as derivatives thereof, may mean: to include, to be included within, to interconnect with, to contain, to be contained within, to connect to or with, to couple to or with, to be communicable with, to cooperate with, to interleave, to juxtapose, to be proximate to, to be bound to or with, to have, to have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system for suppressing undesirable oscillations in a micro-electro-mechanical system (MEMS) scanner, comprising:
   a tunable notch filter operable to receive an original drive signal and to generate a compensated drive signal based on the original drive signal; and
   a MEMS scanner coupled to the tunable notch filter, the MEMS scanner operable to receive the compensated drive signal and to be driven by the compensated drive signal without oscillating at a first mode resonance frequency.

2. The system of claim 1, further comprising an original signal generator coupled to the tunable notch filter, the original signal generator operable to generate the original drive signal.

3. The system of claim 1, wherein the MEMS scanner is further operable to generate a feedback signal based on the compensated drive signal.

4. The system of claim 3, wherein the tunable notch filter is further operable to receive the feedback signal and to generate the compensated drive signal based on the original drive signal and the feedback signal.

5. A system for suppressing undesirable oscillations in a micro-electro-mechanical system (MEMS) scanner, comprising:
   a drive signal generator comprising an adaptive tunable notch filter operable to receive an original drive signal and to generate a compensated drive signal based on the original drive signal; and
   a MEMS scanner coupled to the drive signal generator, the MEMS scanner operable to receive the compensated drive signal from the adaptive tunable notch filter and to be driven by the compensated drive signal without oscillating at a first mode resonance frequency.

6. The system of claim 5, wherein the drive signal generator further comprises an original signal generator coupled to the adaptive tunable notch filter, the original signal generator operable to generate the original drive signal.

7. The system of claim 5, wherein the MEMS scanner is further operable to generate a feedback signal based on the compensated drive signal.

8. The system of claim 7, wherein the adaptive tunable notch filter is further operable to receive the feedback signal and to generate the compensated drive signal based on the original drive signal and the feedback signal.

9. The system of claim 7, wherein the drive signal generator further comprises a filter adapter coupled to the adaptive tunable notch filter, and wherein the filter adapter is operable to receive the feedback signal.

10. The system of claim 9, wherein the filter adapter is further operable to generate an error signal based on the feedback signal and to tune the adaptive tunable filter using the error signal.

11. The system of claim 10, wherein the filter adapter is operable to generate the error signal by comparing the feedback signal to an expected signal, and wherein the error signal comprises a difference between the feedback signal and the expected signal.

12. A system for suppressing undesirable oscillations in a micro-electro-mechanical system (MEMS) scanner, comprising:
- a drive signal generator comprising a self-tuning notch filter operable to receive an original drive signal and to generate a compensated drive signal based on the original drive signal; and
- a MEMS scanner coupled to the drive signal generator, the MEMS scanner operable to receive the compensated drive signal from the self-tuning notch filter and to be driven by the compensated drive signal without oscillating at a first mode resonance frequency.

13. The system of claim 12, wherein the drive signal generator further comprises an original signal generator coupled to the self-tuning notch filter, the original signal generator operable to generate the original drive signal.

14. The system of claim 12, wherein the MEMS scanner is further operable to generate a feedback signal based on the compensated drive signal.

15. The system of claim 14, wherein the self-tuning notch filter is further operable to receive the feedback signal and to generate the compensated drive signal based on the original drive signal and the feedback signal.

16. The system of claim 14, wherein the self-tuning notch filter comprises:
- a compensator operable to receive the feedback signal and to generate a compensator output based on the feedback signal;
- an adjustable gain block coupled to the compensator, the adjustable gain block operable to receive the compensator output and to generate a gain output based on the compensator output; and
- an adder coupled to the adjustable gain block and to the original signal generator, the adder operable to receive the original drive signal and the gain output and to generate the compensated drive signal based on the original drive signal and the gain output.

17. The system of claim 16, wherein the adder is operable to generate the compensated drive signal based on the original drive signal and the gain output by subtracting the gain output from the original drive signal.

18. The system of claim 16, wherein the adjustable gain block is operable to be automatically adjusted to provide a desired gain for the system.

19. The system of claim 16, wherein the adjustable gain block is operable to be adjusted based on automated pattern recognition, automated waveform recognition or a combination of automated pattern recognition and automated waveform recognition.

20. The system of claim 16, wherein the adjustable gain block is operable to be adjusted deterministically by tracking a Q for the MEMS scanner.

* * * * *